US009449293B2

(12) United States Patent
Mahmood et al.

(10) Patent No.: US 9,449,293 B2
(45) Date of Patent: Sep. 20, 2016

(54) DISPLAYING ORGANIZATIONAL INFORMATION FOR A USER'S DOWNLINE IN A GRAPHICAL USER INTERFACE

(71) Applicant: Neways, Inc., Springville, UT (US)

(72) Inventors: Jawaad Bin Mahmood, Tokyo (JP); Hiroki Yoshikawa, Tokyo (JP); Kevin Givan, Highland, UT (US)

(73) Assignee: Neways, Inc., Springville, UT (US)

( * ) Notice: Subject to any disclaimer, the term of this patent is extended or adjusted under 35 U.S.C. 154(b) by 500 days.

(21) Appl. No.: 13/799,992

(22) Filed: Mar. 13, 2013

(65) Prior Publication Data

US 2014/0282169 A1    Sep. 18, 2014

(51) Int. Cl.
*G06F 3/0484* (2013.01)
*G06Q 10/06* (2012.01)
*G06F 3/048* (2013.01)

(52) U.S. Cl.
CPC ............. *G06Q 10/063* (2013.01); *G06F 3/048* (2013.01)

(58) Field of Classification Search
CPC ..... G06F 3/048; G06F 19/327; G06Q 10/06; G06Q 30/0267; G06Q 40/06
See application file for complete search history.

(56) References Cited

U.S. PATENT DOCUMENTS

| | | |
|---|---|---|
| 2006/0277203 A1 | 12/2006 | Uittenbogaard |
| 2010/0225661 A1 | 9/2010 | Gorisch et al. |
| 2011/0219324 A1 | 9/2011 | Watanabe et al. |
| 2012/0117476 A1 | 5/2012 | Siegrist et al. |
| 2013/0054400 A1 | 2/2013 | Charles |

OTHER PUBLICATIONS

International Search Report and Written Opinion for PCT/US14/21327 dated Jul. 30, 2014.

*Primary Examiner* — Jeffrey A Gaffin
*Assistant Examiner* — Rinna Yi
(74) *Attorney, Agent, or Firm* — Workman Nydegger

(57) ABSTRACT

Embodiments are directed to displaying organizational information for a user's downline in an interactive graphical user interface (GUI). In one scenario, a computer system accesses portions of data for a user, where the data corresponds to secondary users in the user's downline. The computer system further generates a first-level view for the interactive GUI. The interactive GUI includes an interior portion configured to display filtered production data for the secondary users according to the accessed data as filtered by various production data filters. The interactive GUI also includes an exterior portion that includes rays extending outward from the interior portion, where each ray represents a secondary user's downline. The length and width of each ray is determined by the number of secondary users, and sales volume generated in the user's downline. The computer system then displays the generated first-level view in the interactive GUI.

20 Claims, 8 Drawing Sheets

DISPLAYING ORGANIZATIONAL INFORMATION FOR A USER'S DOWNLINE IN A GRAPHICAL USER INTERFACE

BACKGROUND

Computers have become highly integrated in the workforce, in the home, in mobile devices, and many other places. Computing systems can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed to display information corresponding to various types of database data. For example, graphical user interfaces (GUIs) may be provided which allow users to view information in different forms including numeric form, chart form, spreadsheet form or in some other manner. These GUIs, however, often present the underlying data in a generic manner that is not easily understood by a user.

BRIEF SUMMARY

Embodiments described herein are directed to displaying organizational information for a user's downline in an interactive graphical user interface (GUI). In one embodiment, a computer system accesses portions of data for a user, where the data corresponds to secondary users in the user's downline. The user's downline includes those users that have become members of an organization under the original user. The computer system further generates a first-level view for the interactive GUI. The interactive GUI includes an interior portion configured to display filtered production data for the secondary users according to the accessed data as filtered by various production data filters. The interactive GUI also includes an exterior portion that includes rays extending outward from the interior portion, where each ray represents a secondary user's downline. In one embodiment, the length and width of each ray is determined by the number of secondary users in the user's downline and their associated purchasing volume, for those that have purchased in a given time period (as shown, for example, in FIG. 4A). In another embodiment, the length and width of each ray is determined by the number of secondary users in the user's downline, regardless of purchasing volume (as shown, for example, in FIG. 4B). The computer system then displays the generated first-level view in the interactive GUI.

In another embodiment, a computer system accesses production data for a user and their downline. The computer system generates and displays a first-level view for the interactive GUI that includes an interior portion and an exterior portion, as above. The computer system then receives an input indicating that a specified secondary user's organization is to be shown in the interactive GUI. The computer system generates a second-level view for the interactive GUI including an interior portion that displays filtered production data for tertiary users under the secondary users according to the accessed data as filtered by various production data filters and an exterior portion that includes rays extending outward from the interior portion of the interactive GUI, where each ray represents a tertiary user's downline. In one embodiment (as generally shown in FIG. 4A), the length and width of each ray is determined by the number of tertiary users in the secondary user's downline and their associated purchasing volume, for those that have purchased in a given time period. In another embodiment (as generally shown in FIG. 4B), the length and width of each ray is determined by the number of tertiary users in the user's downline, regardless of purchasing volume. The computer system then displays the generated second-level view in the interactive GUI. The computer system can continue to "drill" down into an organizations downline, utilizing the above display capabilities.

In another embodiment, as a computer system accesses production data for a user and their downline. The computer system generates and displays an additional 3rd-level view for the interactive GUI that includes an interior portion and an exterior portion, that is different than above, when the displayed user's downline count reaches a number that can individually easily be displayed in the interactive GUI. Currently, this is around 200 nodes, however is not limited to this number. The computer system then receives an input indicating that a specified tertiary user's organization is to be shown in the interactive GUI. The computer system generates a third-level view (e.g. FIG. 6) for the interactive GUI including an interior portion that displays filtered production data for tertiary users organizational lineage, according to the accessed data as filtered by various production data filters and an exterior portion that includes rays extending outward from the interior portion of the interactive GUI, where each ray represents a tertiary user's current month purchasing volume. In the interior display, a downline genealogy is displayed showing how the individual was brought into the organization, in a stair-step fashion. In the exterior display, the length of each ray is determined by the individual user's volume for the current month. The display is in logarithmic scale, to allow for large and small volume to easily be displayed This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 4A:
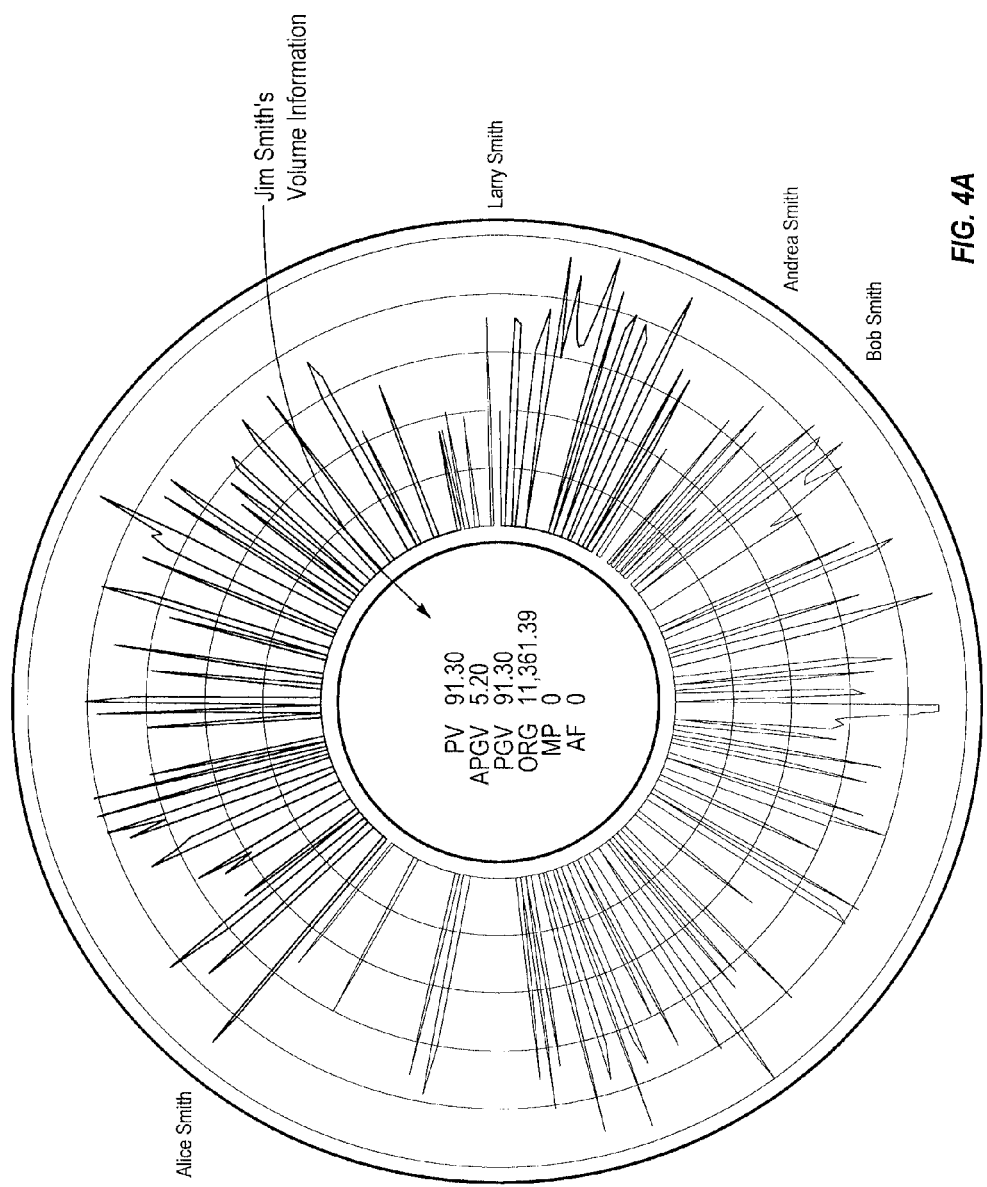
FIG. 4A illustrates an interactive GUI embodiment in which a top-level view of a user's downline is shown.
Figure 4B:
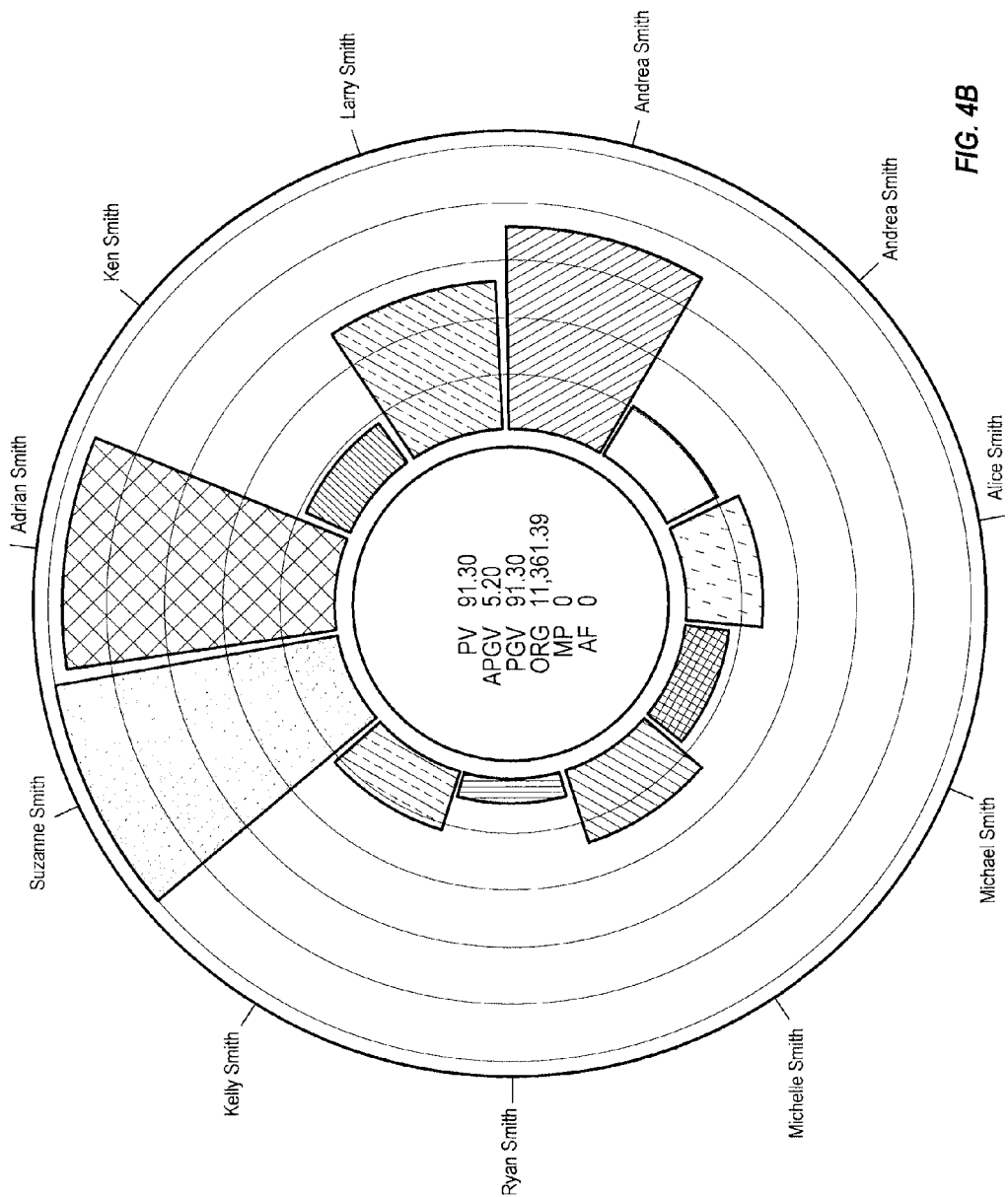
FIG. 4B illustrates an interactive GUI embodiment in which the length and width of each ray is determined by the number of tertiary users in the user's downline, regardless of purchasing volume.

Embodiments described herein are directed to displaying organizational information for a user's downline in an interactive graphical user interface (GUI). In one embodiment, a computer system accesses portions of data for a user, where the data corresponds to secondary users in the user's downline. The user's downline includes those users that have become members of an organization under the original user. The computer system further generates a first-level view for the interactive GUI. The interactive GUI includes an interior portion configured to display filtered production data for the secondary users according to the accessed data as filtered by various production data filters. The interactive GUI also includes an exterior portion that includes rays extending outward from the interior portion, where each ray represents a secondary user's downline. In one embodiment, (as generally shown in FIG. 4A), the length and width of each ray is determined by the number of secondary users in the user's downline and their associated purchasing volume, for those that have purchased in a given time period. In another embodiment (as generally shown in FIG. 4B), the length and width of each ray is determined by the number of secondary users in the user's downline, regardless of purchasing volume. The computer system then displays the generated first-level view in the interactive GUI.

In another embodiment, a computer system accesses production data for a user and their downline. The computer system generates and displays a first-level view for the interactive GUI that includes an interior portion and an exterior portion, as above. The computer system then receives an input indicating that a specified secondary user's organization is to be shown in the interactive GUI. The computer system generates a second-level view for the interactive GUI including an interior portion that displays filtered production data for tertiary users under the secondary users according to the accessed data as filtered by various production data filters and an exterior portion that includes rays extending outward from the interior portion of the interactive GUI, where each ray represents a tertiary user's downline. In one embodiment (as generally shown in FIG. 4A), the length and width of each ray is determined by the number of tertiary users in the secondary user's downline and their associated purchasing volume, for those that have purchased in a given time period. In another embodiment (as generally shown in FIG. 4B), the length and width of each ray is determined by the number of tertiary users in the user's downline, regardless of purchasing volume. The computer system then displays the generated second-level view in the interactive GUI. The computer system can continue to "drill" down into an organizations downline, utilizing the above display capabilities.

In another embodiment, as a computer system accesses production data for a user and their downline. The computer system generates and displays an additional 3rd-level view for the interactive GUI that includes an interior portion and an exterior portion, that is different than above, when the displayed user's downline count reaches a number that can individually easily be displayed in the interactive GUI. Currently, this is around 200 nodes, however is not limited to this number. The computer system then receives an input 108 indicating that a specified tertiary user's organization is to be shown in the interactive GUI. The computer system generates a third-level view (e.g. FIG. 6) for the interactive GUI including an interior portion that displays filtered production data for tertiary users organizational lineage, according to the accessed data as filtered by various production data filters and an exterior portion that includes rays extending outward from the interior portion of the interactive GUI, where each ray represents a tertiary user's current month purchasing volume. In the interior display, a downline genealogy is displayed showing how the individual was brought into the organization, in a stair-step fashion. In the exterior display, the length of each ray is determined by the individual user's volume for the current month. The display is in logarithmic scale, to allow for large and small volume to easily be displayed.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below, as well as tablets, and smartphones, with access to the internet. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media, including WAN (Wide Area Network) connections, allowing connectivity over the internet.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
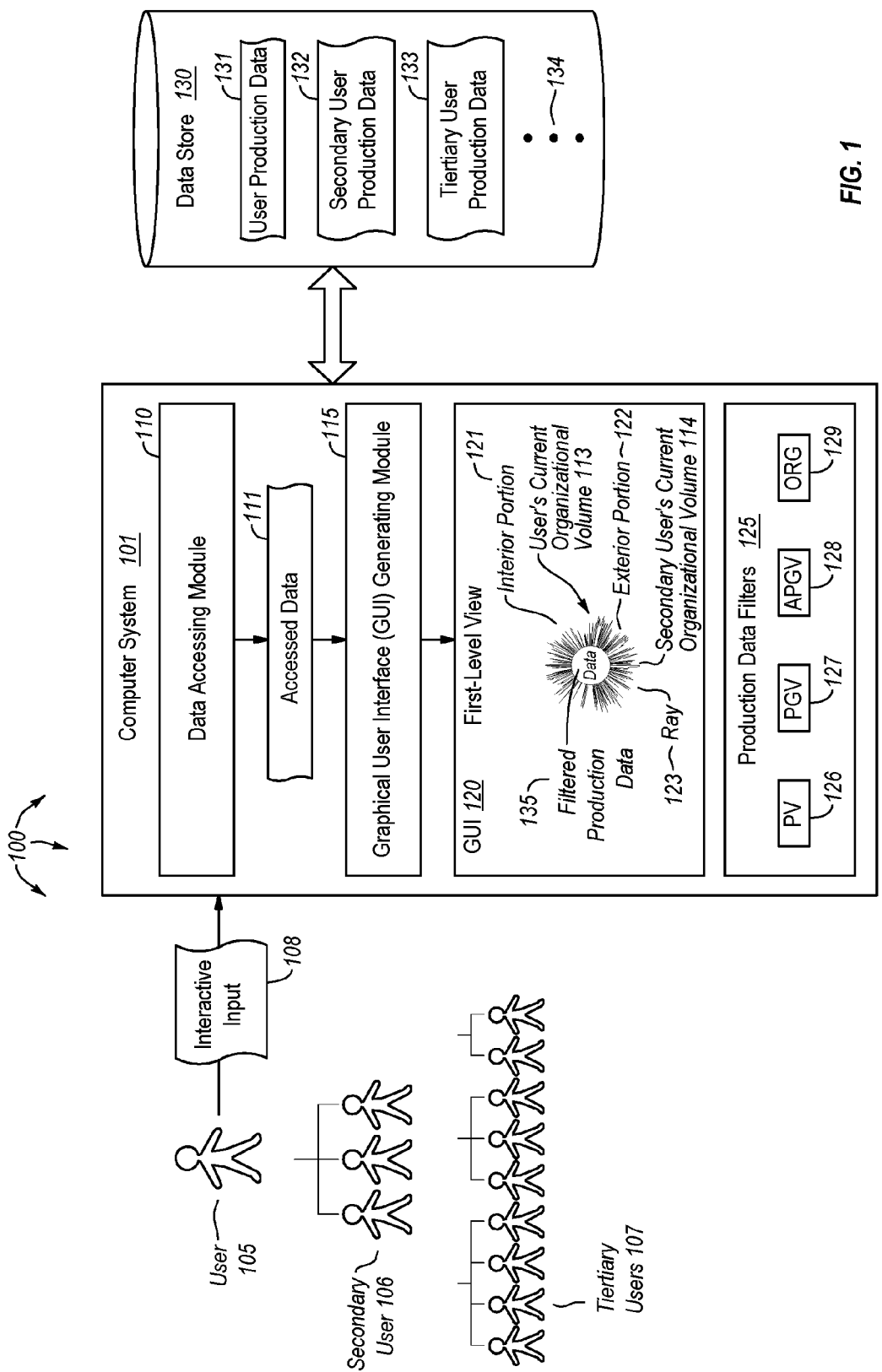
FIG. 1 illustrates a computer architecture in which embodiments described herein may operate including displaying organizational information for a user's downline in an interactive GUI.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. For instance, the data accessing module 110 of computer system 101 may be used to access data stored in data store 130. The data store may be any type of local, remote or distributed data store, and may include storage area networks (SANs) or other similar storage implementations.

The accessed data may include user production data 131, secondary user production data 132, tertiary user production data 133 or other data 134. The user production data 131 may include sales figures for the user 105. For example, some of the embodiments described herein relate to multi-level marketing (MLM). As such, a user (e.g. 105) may desire to see how much they have produced for a given time frame (i.e. how much product they have sold in a month). This number is reflected in the user production data 131. The secondary user production data 132 includes the overall production of user 105's secondary users 106, and the tertiary user production data 133 includes overall production of user 105's tertiary users 107. The production data may include the products that were sold, the total number of products sold, the total monetary amount that was sold (in local currency (e.g. dollars)), or other information. The production data may be accessed and shown for different timespans (e.g. by month, by year, between specified dates, total amounts sold since initially starting the MLM, etc.).

A graphical user interface (GUI) generating module 115 may be used to present the accessed data 111 to the user 105. The GUI may take on various shapes or forms and, as such, may be different than the embodiments shown in the Figures. Accordingly, the GUI may be circular, rectangular, square, oval, or may be arranged in some other shape. As shown in FIG. 1, GUI 120 includes a circular first-level view that has an interior portion 121 and an exterior portion 122. The first-level view shows the user's current organization volume data 113, as well as the secondary users' organizational volume data 114 as rays 123 in the exterior portion 122. Each ray represents an immediate downline individual's organization. A "downline", as the term is conventionally referred to in MLM businesses, includes the businesspersons that join under the user. These people that join directly under the user 105 are secondary users 106, while users that join under secondary users are referred to as tertiary users 107. It will be understood that substantially any number of levels may separate a newly joined user and the highest person above them. Accordingly, user 105 may (unless limited by that MLM's policies) have any number of subsidiary users at any level down. The GUI 120 as well as these concepts will be explained further below with regard to methods 200 and 300 of FIGS. 2 and 3, respectively.

Figure 2:
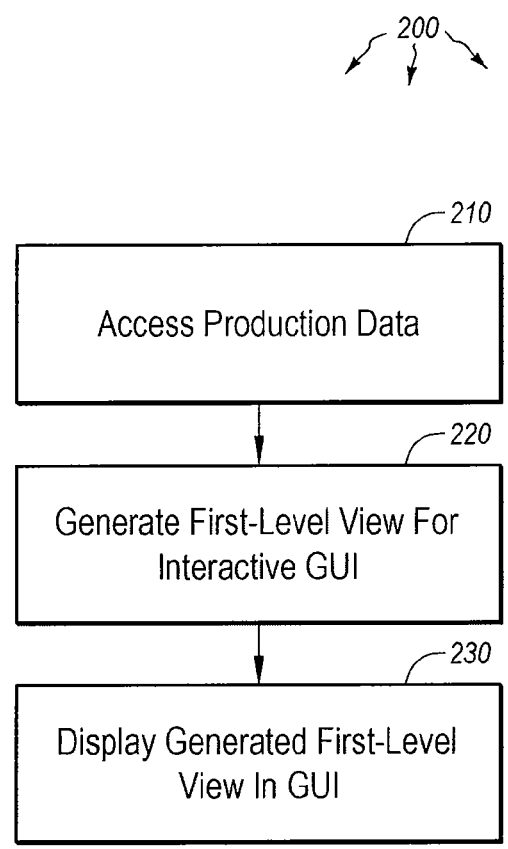
FIG. 2 illustrates a flowchart of an example method for displaying organizational information for a user's downline in an interactive GUI.
Figure 3:
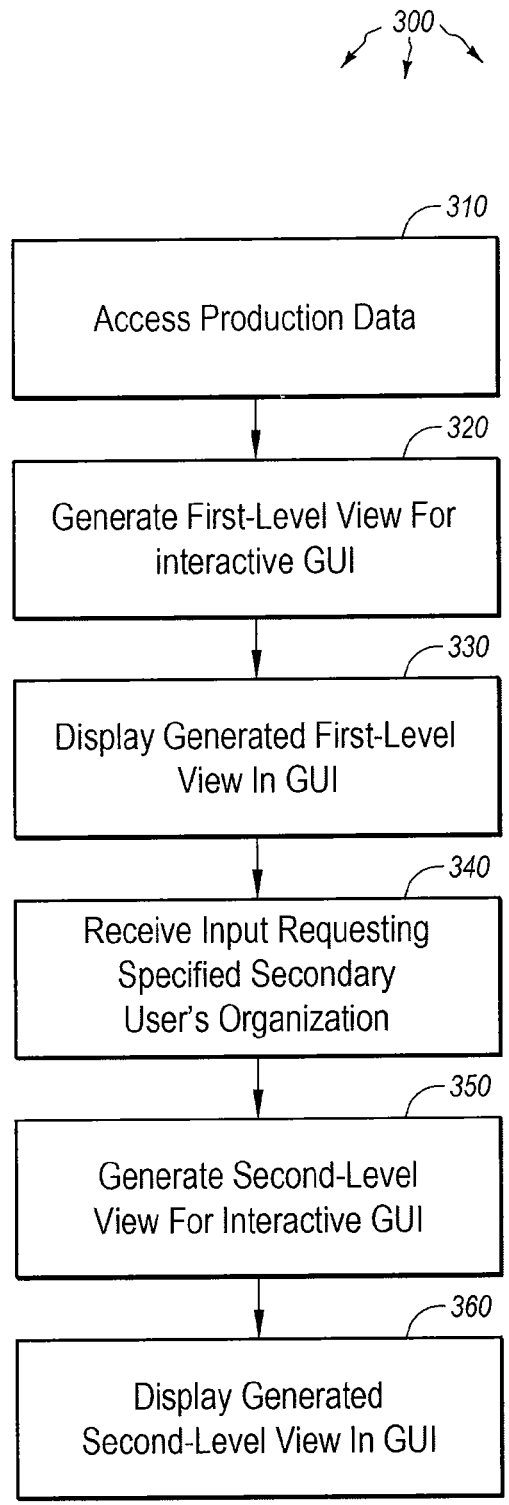
FIG. 3 illustrates a flowchart of an alternative example method for displaying organizational information for a user's downline in an interactive GUI.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for displaying organizational information for a user's downline in an interactive GUI. The method 200 will now be described with frequent reference to the components and data of environment 100.

Method 200 includes an act of accessing one or more portions of data for at least one user, the user having a downline comprising one or more secondary users, the data including production data for the user and at least one secondary user in the user's downline (act 210). For example, data accessing module 110 may access user production data 131 for user 105. As explained above, the secondary user production data 132 corresponds to the secondary users 106 (i.e. those people that signed up for the MLM directly under user 105. The tertiary user production data 133 corresponds to the tertiary users 107 who signed up under one of the secondary users. Other levels of users below the tertiary level are possible (although not shown in FIG. 1). The production data for each MLM businessperson may be stored in data store 130, and may be accessed for display in the GUI 120.

Figure 5:
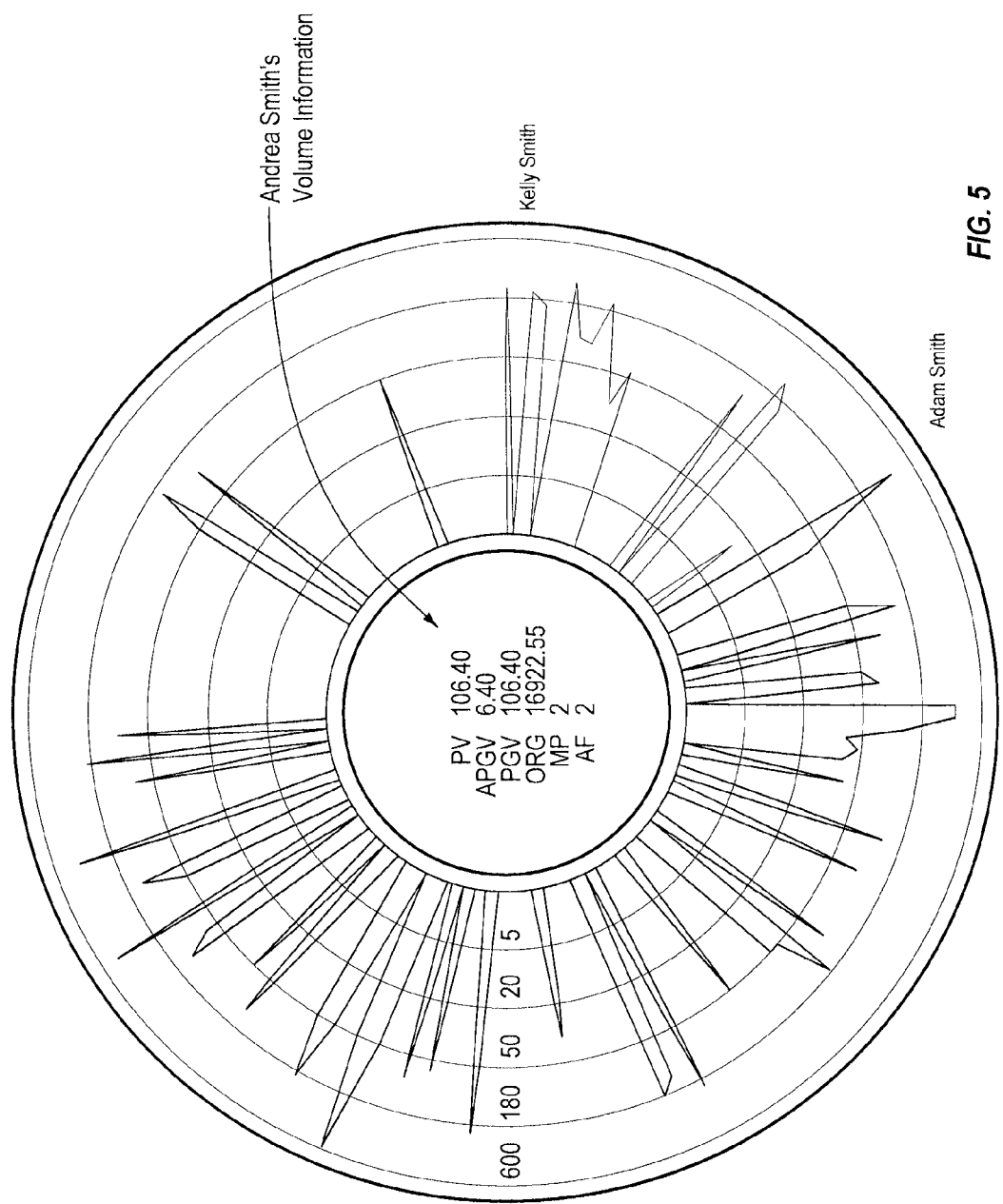
FIG. 5 illustrates an interactive GUI embodiment in which a second-level view of a user's downline is shown.

Method 200 next includes an act of generating a first-level view for the interactive GUI (act 220) including: an interior portion configured to display filtered production data for the secondary users according to the one or more portions of accessed data as filtered by one or more production data filters, and an exterior portion that includes one or more rays extending outward from the interior portion of the interactive GUI, each ray representing a secondary user's downline, the length and width of each ray being determined by the number of secondary users in the user's downline and their associated purchasing volume, for those that have purchased in a given time period (e.g. within a given month). GUI 120 shows an interior portion 121 that includes filtered production data 135. The filtered production data may include production data that has been limited or filtered in some manner. For instance, production data filters 125 may be applied to show certain data for a given user. As shown in FIG. 5, this data may be displayed in the interior portion of the first-level view. Each of these production data filters will be explained further below.

The first-level view also includes an exterior portion 122 with multiple different rays 123. At least in some embodiments, each ray represents a user, their downline and their associated purchasing volume, for those that have purchased in the given month. Wider rays indicate larger downlines, while smaller rays indicate smaller downlines Shorter and taller rays indicate personal and organizational purchasing volume for the given month. Accordingly, a user can look at a first-level view and see how many secondary users are in their downline, and how large their secondary users' downlines are. In some embodiments, the size of the rays may be dependent on factors other than the number of people including, perhaps, the amount of production for each downline.

Each ray in the exterior portion 122 of the GUI 120 may be color-coded to its corresponding secondary user's groups. Thus, in FIG. 4A the top level user is represented by the data in the center circle, such as be Jim Smith, while secondary users are listed on the outside of the rays, where each ray defines the secondary users organization size, such as Andrea Smith, Bob Smith and Alice Smith. Each user's corresponding rays may be color-coded, so that user 105 (i.e. Jim Smith) can easily see the size of each secondary user's downline. Accordingly, all of Andrea's rays may be red, Bob's rays may be blue, Alice's rays may be green and Larry's ray may be yellow. If Jim wishes to select a user's group, Jim can mouse click, tap (using a touchscreen) or otherwise select a ray, which will select all of the rays for that user. The interior portion of the GUI may also show filtered production information, as shown in FIGS. 4A-7.

Figure 6:
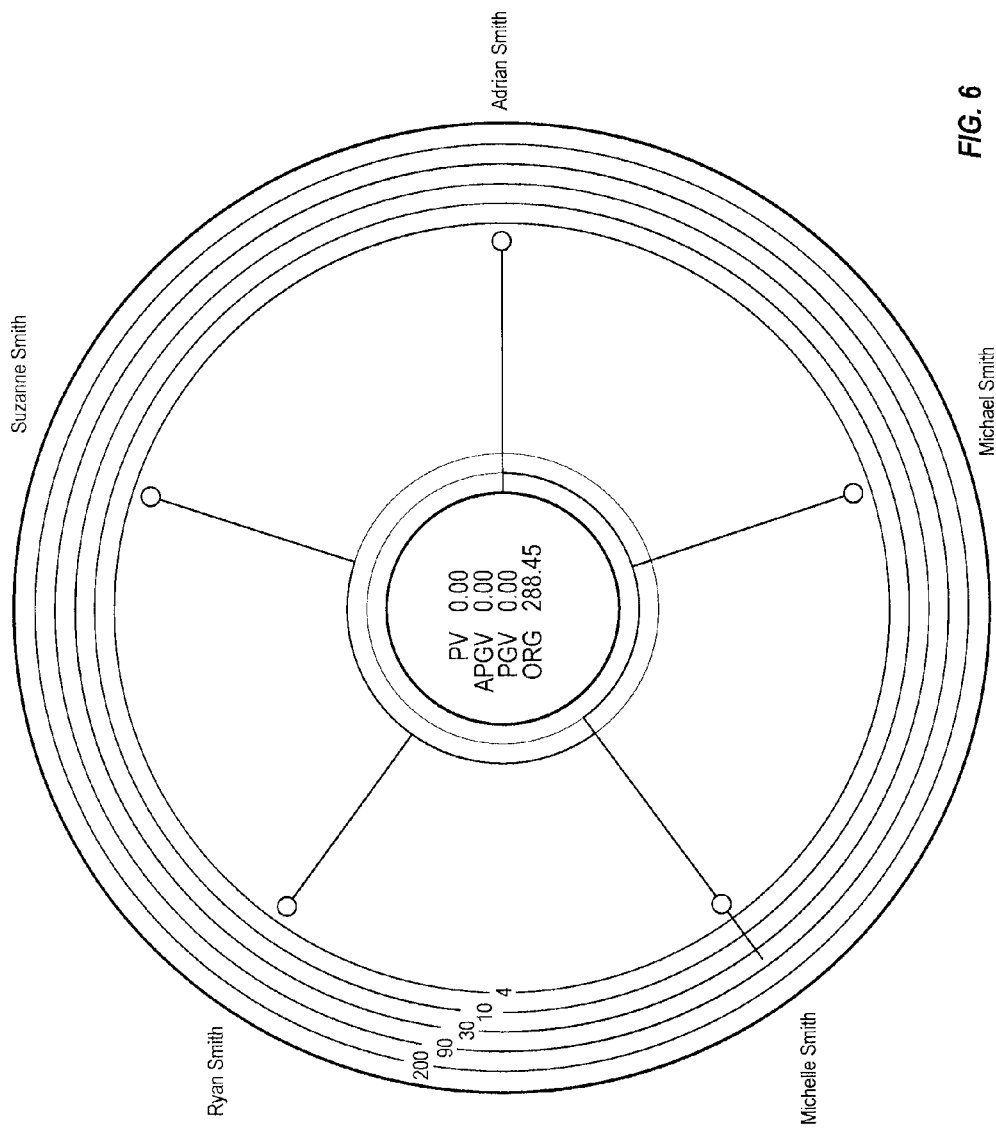
FIG. 6 illustrates an interactive GUI embodiment in which a third-level view of a user's downline is shown.
Figure 7:
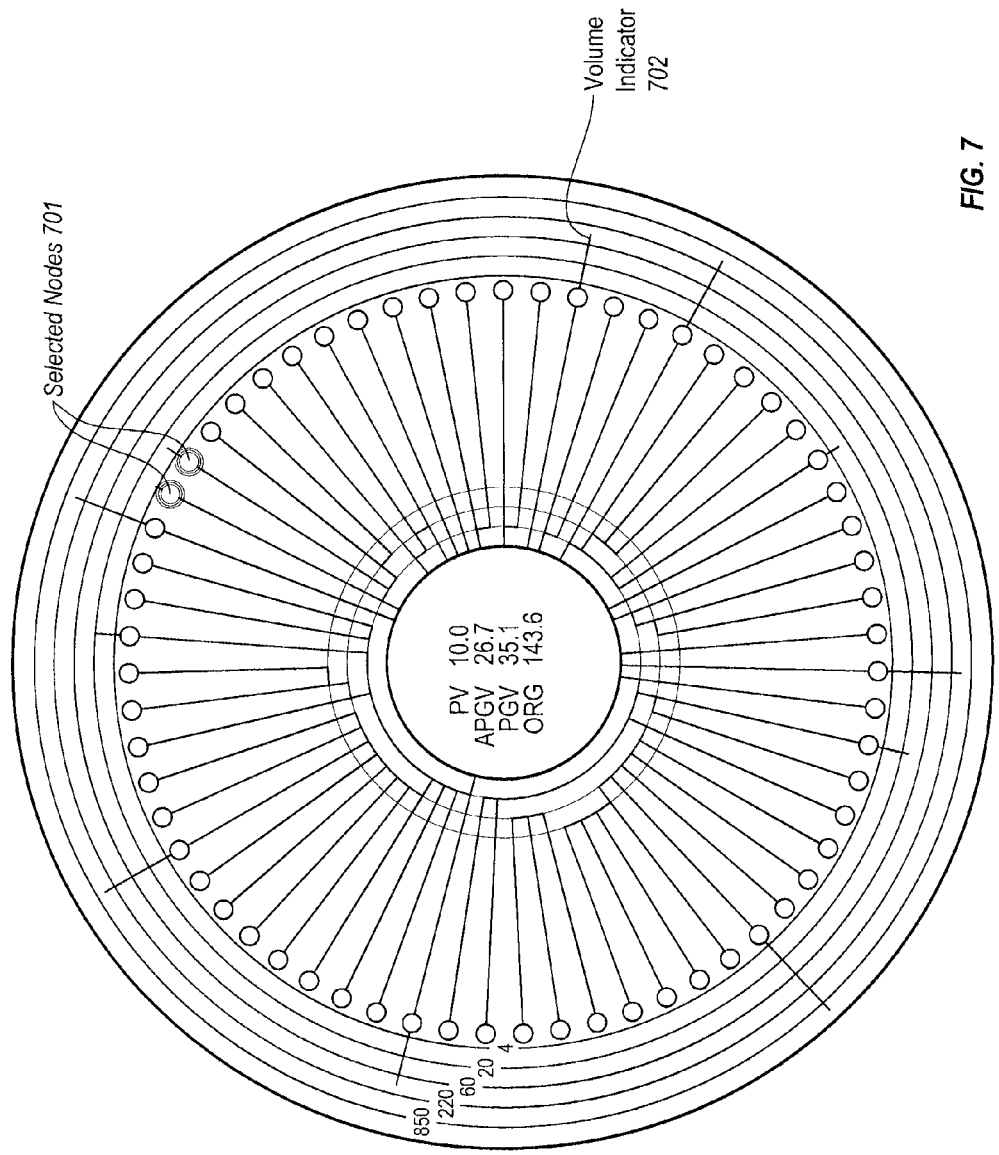
FIG. 7 illustrates an alternative interactive GUI embodiment in which an intermediate-level view of a user's downline is shown.

The user 105 (e.g. Jim Smith) may also click-and-hold, tap-and-hold or perform some other gesture to indicate that he wishes to drill down within a specified downline. For example, Jim may drill down on Andrea Smith and see Andrea's downline pictured in FIG. 5. Andrea's downline includes Kelly Smith and Adam Smith, and rays representing each of their downlines. Numbers may be shown on the exterior portion of this second-level view, to provide an indication of the size of these secondary users' organizations. User 105 may desire to drill even further down, and may be presented with FIG. 6 or 7. FIGS. 6 and 7 show an indication of who recruited each secondary user. They also show data for each user and that user's downline when selected.

This third-level view also shows how much product volume each user and their downline has purchased, using the lines stretching into the numbered rings (in FIG. 6, for example, the numbered rings represent values of 200, 90, 30, 10 and 4). These lines show that, for example, Michelle Smith and her organization have sold close to 90 in product volume. This will be explained further below. Each user's lines may be color-coded. Each solid line indicates a connection to each person who joined, and who they joined under. Thus, in FIG. 6, Michael Smith and Michelle Smith joined directly under Adrian, while Ryan and Suzanne both joined under Michelle. In this manner, a user can drill down to a specified level and view each person in the downline, who the signed up under, and what they are currently producing.

The production data for each user or user group may be shown in the interior portion 121 of the GUI. The production data may be raw or filtered. The production data filters 125 include a personal volume (PV) filter 126, which includes the user's personal sales within a specified timeframe (e.g. a day, week, month, year, etc.). In one specific embodiment, the user's production data for the current month is shown in the interior portion 121 of the GUI. Another of the production filters 125 includes a personal group volume (PGV) filter 127, which includes sales for those secondary users that the user personally initiated. In some cases, the user's personal group volume may be limited to secondary users that have not achieved a specified level (e.g. an executive level), and may be shown on a logarithmic scale (e.g. in FIGS. 5-7).

Yet another of the production data filters may include an affinity personal group volume (APGV) filter 128, which includes sales for those secondary users that have reached a specified level of seniority (e.g. executive level). The organization volume filter 129 shows the user's personal sales combined with the sales for each of the secondary users through the user's entire downline. Accordingly, the first- (or subsequent) level view generated by the GUI generating module 115 (act 230) allows the user to see how much each specified group of users is producing, and may use that information in the management and communication of their downline. In this manner, a user can view their organization at a high level, at an intermediate level, or on a fine-grained level. At each level, the user may be able to see the names of the individuals that are at that level, and how much they (and their downlines) are producing. The GUI 120 may also allow the user 105 to contact users in their downline directly from the GUI using email, text messages or other forms of communicating. As such, a user can more easily monitor and manage production in their MLM business.

FIG. 3 illustrates a flowchart of an alternative method 300 for displaying organizational information for a user's downline in an interactive GUI. The method 300 will now be described with frequent reference to the components and data of environment 100.

The data accessing module 110 accesses production data for at least one user (e.g. 105), the user having a downline comprising one or more secondary users, the production data including production data for the user and at least one secondary user in the user's downline (act 310). The GUI generating module 115 then generates a first-level view from the accessed data 111 (act 320) including: an interior portion 121 configured to display filtered production data for the secondary users according to the one or more portions of accessed data as filtered by one or more production data filters 125, and an exterior portion 122 that includes one or more rays 123 extending outward from the interior portion of the interactive GUI 120, each ray representing a secondary user's downline organization. In one embodiment (as generally shown in FIG. 4A), the length and width of each ray is determined by the number of secondary users in the user's downline and their associated purchasing volume, for those that have purchased in the given month. In another embodiment (FIG. 4B), the length and width of each ray is determined by the number of secondary users in the user's downline, regardless of purchasing volume. This generated first-level view (an example of which is shown in FIGS. 4A & 4B) is then displayed in the interactive GUI (act 330). Once displayed, the GUI allows the user to view and manage users in their downline. The GUI is interactive, allowing the user to select certain users and view their downlines.

Indeed, method 300 includes an act of receiving an input indicating that a specified secondary user's organization is to be shown in the interactive GUI (act 340). The GUI generating module 115 then generates a second-level view for the interactive GUI (act 350) (an example of which is shown in FIG. 5), including: an interior portion configured to display filtered production data for tertiary users 107 under the secondary users 106 according to the accessed data as filtered by one or more production data filters 125, and an exterior portion that includes one or more rays 123 extending outward from the interior portion of the interactive GUI 120, each ray representing a tertiary user's downline. In FIG. 4A, the length and width of each ray is determined by the number of tertiary users in the secondary user's downline and their associated purchasing volume, for those that have purchased in the given time period (e.g. in the given month). In the secondary display, the length and width of each ray is determined by the number of tertiary users in the user's downline, regardless of purchasing volume.

Thus, as shown in FIG. 5, Andrea Smith's downline includes Kelly Smith and Adam Smith. Kelly has only a few members in her downline, while Adam has many. Each ray shows the number of people in a specific downline and their corresponding product volume within a specific member's downline. Thus, Adam Smith's organization ray (going clockwise) has many downline members and close to 600 in product volume. Each ray in Adam Smith's organization indicates secondary user's volume, with various personal volume levels. As can be seen, the scale (5, 20, 50, 180, 600) may be logarithmic. The wider the ray, the more members there are at various levels. The narrower the ray, the fewer members there are. Thus, if Adam has a few members in his downline that, themselves, have very large downlines, those members' rays will be both wide and tall. Thus, the GUI user, Andrea Smith, can view each level of her downline, and explore into the downlines of those below her. If she were to select one of the rays representing Adam Smith's downline, a graph similar to that of FIG. 5, 6 or 7 would be shown, depending on the size of the ray selected, but from Adam's point of view, showing his downline organization.

Still further, Andrea Smith may touch, click on or otherwise select a single ray or all the rays of a specified user and see how much product they (and their downline) are selling. The interior portion of the graph may show filtered data including filters such as personal volume (PV) (which includes the user's personal sales within a specified timeframe (in this case, within the current volume month), Another of the production filters 125 includes a personal group volume (PGV) (which includes sales for those secondary users that the secondary users personally initiated), affinity personal group volume (APGV) (which includes sales for those secondary users that have reached a specified level of seniority) and organization volume (ORG) (which includes the user's personal sales combined with the sales for each of the secondary and lower users for their entire organization).

Thus, as shown in FIG. 5, a second-level view in the interactive GUI may be displayed (act 360). In some embodiments, this second-level view replaces the first-level view in the interactive GUI, while in other embodiments, the second-level view is displayed next to or near the first-level view. The second-level view may look like any of FIGS. 5-7, depending on the size of the second level. For example, FIG. 5 shows a secondary level in Jim Smith's downline. Andrea Smith's downline may then be selected by Jim (or by another user), and shown in FIG. 5. As Adam Smith has a large number of members in his downline, the rays are shown as such in FIG. 5. Were Adam to have a smaller number of members, the second-level view would look more like Kelly Smith's view on FIG. 6.

Kelly Smith's view in FIG. 6 shows each of the five people who joined under (i.e. were recruited by) Kelly or under someone under her. Thus, it can be seen from the dark circular lines that Michael and Michelle joined directly under Adrian Smith, while Ryan and Suzanne joined under Michelle. Volume for each member can be seen easily by looking at the volume indicator (see 702 of FIG. 7 for further examples) extending into the ringed scale. This ringed scale may also be logarithmic, and may indicate how much product volume that user and their organization has sold for a particular time period, e.g. current volume month. Thus, in FIG. 6, it can be seen that Michelle has sold approximately 80 in product volume, while the other users in Kelly's group have not sold anything.

FIG. 7 represents a view similar to that of FIG. 6, but includes more users. Each line off of the interior circle shows how the user was recruited, and each volume indicator 702 shows how much volume (in dollars or products) that user has sold, as indicated by the numbered rings 850, 220, 60, 20 and 4. In cases where many users are shown, the names may or may not be shown on the graph. Indeed, the GUI user may be able to select whether the names are shown or not. The GUI user may wish to see raw or filtered data for one or more users. Thus, the interior portion of the GUI may show raw or filtered data for selected users 701. Thus, for those two selected users, their PV was 10.0, their APGV was 26.7, their PGV was 35.1 and their ORG was 143.6. The GUI user may select and unselect users to see their data. The GUI user can also easily see who is producing volume using the volume indicators. In some cases, this subsequent-level view may highlight each secondary (or tertiary or lower) user that is within a threshold distance from qualifying for an advancement. The GUI user may then click on, touch or otherwise select that user's name or representative circle to contact that user (via email, text message, phone or any number of other contact methods) and let them know that they are very close to qualifying for the next level.

Accordingly, methods, systems and computer program products are provided which display organizational information for a user's downline in an interactive GUI. A GUI user may drill down within their downline to easily see who is producing, and how much they are producing. The GUI user can also see who joined under whom, and use the interactive GUI to easily contact users when needed.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
one or more processors;
system memory;
one or more computer-readable storage media having stored thereon computer-executable instructions that, when executed by the one or more processors, causes the computing system to perform a method for displaying organizational information for a user's downline in an interactive graphical user interface (GUI), the method comprising the following:
accessing one or more portions of data for at least one user, the user having a downline comprising one or more secondary users, the data including production data for the user and at least one secondary user in the user's downline;
generating a first-level view for the interactive GUI, including:
an interior portion configured to display filtered production data for the secondary users according to the one or more portions of accessed data as filtered by one or more production data filters; and
an exterior portion that includes one or more rays with variable length and width extending outward from the interior portion of the interactive GUI, each ray representing a secondary user's downline, both the length and width of each ray being determined by a number of secondary users in the user's downline and the associated purchasing volume within a given time period the secondary user's organization is generating;
displaying the generated first-level view in the interactive GUI.

2. The computer system of claim 1, further comprising:
receiving an input indicating that a specified secondary user's organization is to be shown in the interactive GUI;
generating a second-level view for the interactive GUI including:
an interior portion configured to display filtered production data for tertiary users under the secondary users according to the accessed data as filtered by one or more production data filters; and
an exterior portion that includes one or more rays with variable length and width extending outward from the interior portion of the interactive GUI, each ray representing an tertiary user's downline, both the length and width of each ray being determined by the number of tertiary users in the secondary user's downline and the associated purchasing volume within the given time period the tertiary user's organization is generating; and
displaying the generated second-level view in the interactive GUI.

3. The computer system of claim 2, wherein the second-level view replaces the first-level view in the interactive GUI.

4. The computer system of claim 2, wherein the input indicating that a specified secondary user's organization is to be shown comprises a selection of a selected ray.

5. The computer system of claim 4, wherein each ray is labeled with a secondary user's name.

6. The computer system of claim 1, wherein the data corresponding to secondary users in the user's downline further includes the secondary users' production data.

7. The computer system of claim 1, wherein each ray in the exterior portion of the GUI is color-coded to its corresponding secondary user.

8. The computer system of claim 1, wherein user inputs allow the user to drill down within the user's downline to view users that are increasingly deeper in the user's downline.

9. The computer system of claim 1, wherein the first-level view includes an indication of who recruited each secondary user.

10. The computer system of claim 1, wherein at least one of the production data filters comprises personal volume (PV), which includes the user's personal sales volume within a specified timeframe.

11. The computer system of claim 1, wherein at least one of the production data filters comprises personal group volume (PGV), which includes sales for those secondary users that the user personally initiated.

12. The computer system of claim 1, wherein at least one of the production data filters comprises affinity personal group volume (APGV), which includes sales for those secondary users that have reached a specified level of seniority.

13. The computer system of claim 1, wherein at least one of the production data filters comprises organization volume, which includes the user's personal sales and the sales for each of the secondary users.

14. A computer system comprising the following: one or more processors; system memory; one or more computer-readable storage media having stored thereon computer-executable instructions that, when executed by the one or more processors, causes the computing system to perform a method for displaying organizational information for a user's downline in an interactive graphical user interface (GUI), the method comprising the following:
accessing one or more portions of data for at least one user, the user having a downline comprising one or more secondary users, the data including production data for the user and at least one secondary user in the user's downline;
generating a first-level view for the interactive GUI, including:
an interior portion configured to display filtered production data for the secondary users according to the one or more portions of accessed data as filtered by one or more production data filters; and
an exterior portion that includes one or more rays with variable length and width extending outward from the interior portion of the interactive GUI, each ray representing a secondary user's downline, both the length and width of each ray being determined by a number of secondary users in the user's downline and the associated purchasing volume within a given time period the secondary user's organization is generating;
displaying the generated first-level view in the interactive GUI;
receiving an input indicating that a specified secondary user's organization is to be shown in the interactive GUI;
generating a second-level view for the interactive GUI including:
an interior portion configured to display filtered production data for tertiary users under the secondary users according to the accessed data as filtered by one or more production data filters; and
an exterior portion that includes one or more rays with variable length and width extending outward from the interior portion of the interactive GUI, each ray representing a tertiary user's downline, both the length and width of each ray being determined by the number of tertiary users in the secondary user's downline and the associated purchasing volume within the given time period the tertiary user's organization is generating; and
displaying the generated second-level view in the interactive GUI.

15. The computer system of claim 14, wherein the second-level view of the interactive GUI includes an indication of who recruited each tertiary user.

16. The computer system of claim show 14, wherein the second-level view of the interactive GUI highlights each secondary user that is within a threshold distance from qualifying for an advancement.

17. The computer system of claim 14, wherein the interactive GUI illustrates to each user the current performance of their organization.

18. The computer system of claim 14, wherein one or more production data filters are provided to dynamically filter users based on production statistics.

19. The computer system of claim 14, wherein a linear sales volume indicator of dynamic length is provided next to each secondary user that has produced sales volume during a specified timeframe, the sales volume indicator's length corresponding to an amount of sale volume produced by the secondary user.

20. A computer system comprising the following:
one or more processors;
system memory;
one or more computer-readable storage media having stored thereon computer-executable instructions that, when executed by the one or more processors, causes the computing system to perform a method for displaying organizational information for a user's downline in an interactive graphical user interface (GUI), the method comprising the following:
accessing one or more portions of data for at least one user, the user having a downline comprising one or more secondary users, the data including production data for the user and at least one secondary user in the user's downline;
generating a first-level view in the interactive GUI, including:
an interior portion configured to display filtered production data for the secondary users according to the one or more portions of accessed data as filtered by one or more production data filters; and
an exterior portion that includes one or more rays with variable length and width extending outward from the interior portion of the interactive GUI, each ray representing a secondary user's downline, both the length and width of each ray being determined by a number of secondary users and associated purchasing volume within a given time period generated in the user's downline;
displaying the generated first-level view in the interactive GUI;
receiving an input indicating that a specified secondary user's organization is to be shown in the interactive GUI;
generating a second-level view for the interactive GUI including:
an interior portion configured to display filtered production data for tertiary users under the secondary users according to the accessed data as filtered by one or more production data filters; and
an exterior portion that includes one or more hierarchical indicators extending outward from the interior portion of the interactive GUI, each hierarchical indicator representing a tertiary user, wherein a linear sales volume indicator of dynamic length is provided next to each tertiary user that has produced sales during a specified timeframe, the sales volume indicator's length corresponding to an amount of sales volume produced by the secondary user; and displaying the generated second-level view in the interactive GUI.

\* \* \* \* \*